US008813717B2

(12) United States Patent
Ikeda

(10) Patent No.: US 8,813,717 B2
(45) Date of Patent: Aug. 26, 2014

(54) INTERNAL COMBUSTION ENGINE

(75) Inventor: Yuji Ikeda, Kobe (JP)

(73) Assignee: Imagineering, Inc., Hyogo (JP)

(*) Notice: Subject to any disclaimer, the term of this patent is extended or adjusted under 35 U.S.C. 154(b) by 153 days.

(21) Appl. No.: 13/500,107

(22) PCT Filed: Oct. 6, 2010

(86) PCT No.: PCT/JP2010/067586

§ 371 (c)(1),
(2), (4) Date: Jun. 15, 2012

(87) PCT Pub. No.: WO2011/043399

PCT Pub. Date: Apr. 14, 2011

(65) Prior Publication Data

US 2012/0240873 A1    Sep. 27, 2012

(30) Foreign Application Priority Data

Oct. 6, 2009  (JP) ................ 2009-232902

(51) Int. Cl.
*F02F 3/26* (2006.01)
*F02B 23/00* (2006.01)
*F02P 3/02* (2006.01)
*H01J 1/50* (2006.01)
*H05B 37/02* (2006.01)

(52) U.S. Cl.
USPC ........... 123/279; 123/664; 123/665; 123/620; 123/633; 313/153; 313/155; 315/149; 315/153; 315/338; 315/343

(58) Field of Classification Search
USPC .......... 123/279, 664, 665, 620, 633, 617; 313/153, 155; 315/149, 153, 338, 343
See application file for complete search history.

(56) References Cited

U.S. PATENT DOCUMENTS

| | | | | |
|---|---|---|---|---|
| 1,759,161 A | * | 5/1930 | Lang | 123/275 |
| 2,921,566 A | * | 1/1960 | Meurer | 123/260 |
| 4,294,206 A | * | 10/1981 | Urlaub et al. | 123/276 |
| 4,403,504 A | * | 9/1983 | Krage et al. | 73/114.29 |

(Continued)

FOREIGN PATENT DOCUMENTS

| JP | 2009-038025 A | 2/2009 |
|---|---|---|
| JP | 2009-121406 A | 6/2009 |

(Continued)

OTHER PUBLICATIONS

International Search Report for PCT/JP2010/067586, dated Feb. 22, 2011.

*Primary Examiner* — Lindsay Low
*Assistant Examiner* — Tea Holbrook
(74) *Attorney, Agent, or Firm* — Westerman, Hattori, Daniels & Adrian, LLP

(57) ABSTRACT

An internal combustion engine 100 includes a cylinder 102 that defines a combustion chamber 196 causing a premixed gas to be combusted, a piston 120 that defines the combustion chamber 196 together with the cylinder 102, and reciprocates in the cylinder 102, and an active species generator 150 that generates active species. The internal combustion engine 100 promotes combustion of the mixed gas by the active species generated by the active species generator 150. The piston 120 includes an active species generation chamber 194 that is formed therein and open to a top surface of the piston 120, and in which the active species generator 150 generates the active species.

10 Claims, 5 Drawing Sheets

(56) References Cited

U.S. PATENT DOCUMENTS

| | | | |
|---|---|---|---|
| 4,437,338 A * | 3/1984 | Wilson | 73/114.29 |
| 4,492,194 A * | 1/1985 | Chmela et al. | 123/276 |
| 4,742,805 A * | 5/1988 | Matsushita et al. | 123/270 |
| 4,774,914 A * | 10/1988 | Ward | 123/162 |
| 6,453,862 B1 * | 9/2002 | Holzmann | 123/162 |
| 6,553,981 B1 * | 4/2003 | Suckewer et al. | 123/620 |
| 6,581,581 B1 * | 6/2003 | Bebich | 123/536 |
| 6,634,331 B2 * | 10/2003 | Truglio | 123/162 |
| 6,651,615 B2 * | 11/2003 | Suzuki et al. | 123/305 |
| 6,832,589 B2 * | 12/2004 | Kremer et al. | 123/193.6 |
| 6,838,831 B2 * | 1/2005 | Brandenburg et al. | 315/111.21 |
| 7,207,312 B2 * | 4/2007 | Inoue et al. | 123/310 |
| 7,493,886 B2 * | 2/2009 | Blank | 123/256 |
| 7,793,632 B2 * | 9/2010 | Idogawa et al. | 123/169 R |
| 8,464,695 B2 * | 6/2013 | Ikeda | 123/539 |
| 8,499,746 B2 * | 8/2013 | Ikeda et al. | 123/536 |
| 2007/0235002 A1 | 10/2007 | Blank | |
| 2009/0031988 A1 * | 2/2009 | Shiraishi et al. | 123/406.19 |
| 2010/0192909 A1 * | 8/2010 | Ikeda | 123/436 |
| 2010/0258097 A1 | 10/2010 | Takahashi et al. | |
| 2011/0023458 A1 * | 2/2011 | Ikeda | 60/275 |
| 2012/0097140 A1 * | 4/2012 | Kusunoki et al. | 123/620 |
| 2012/0258016 A1 * | 10/2012 | Makita et al. | 422/186.04 |

FOREIGN PATENT DOCUMENTS

| | | | |
|---|---|---|---|
| JP | 2009-533584 A | 9/2009 | |
| JP | 2010-216270 A | 9/2010 | |
| WO | 2009-113691 A1 | 9/2009 | |
| WO | WO 2009113691 A1 * | 9/2009 | F02P 23/04 |

* cited by examiner

INTERNAL COMBUSTION ENGINE

TECHNICAL FIELD

The present invention relates to an internal combustion engine in which a piston reciprocates.

BACKGROUND ART

There is known an internal combustion engine that generates active species in a combustion chamber, and thus, accelerates combustion of mixed gas. For example, Patent Document 1 discloses an internal combustion engine of this kind.

More specifically, the internal combustion engine disclosed in Patent Document 1 causes a spark discharge to be generated in a discharge gap of the spark plug and microwaves to be radiated toward the discharge gap. A plasma generated in the discharge gap receives energy from the microwave pulse. As a result thereof, electrons in a plasma region are accelerated and a volume of the plasma increases. Many active species are generated accompanied with the generation of the plasma.

PRIOR ART DOCUMENT

Patent Document

[Patent Document 1] Japanese Unexamined Patent Application, Publication No. 2009-38025

DISCLOSURE OF THE INVENTION

Problems to be Solved by the Invention

Meanwhile, in the conventional internal combustion engine, since a region, in which an active species generator generates active species, is small in comparison with the combustion chamber, it has been difficult to bring the active species into contact with a large amount of mixed gas. Accordingly, an amount of mixed gas whose chemical reaction is promoted by the active species remains relatively small. As a result thereof, it is difficult to sufficiently acquire an effect of promoting combustion by the active species.

The present invention has been made in view of the above-described facts, and it is an object of the present invention to enhance the effect of promoting combustion by active species by effectively bringing the active species into contact with mixed gas, in the internal combustion engine in which the combustion of the mixed gas is promoted by the active species.

Means for Solving the Problems

A first aspect of the present invention is an internal combustion engine, comprising: a cylinder defining a combustion chamber that causes pre-mixed gas to be combusted; a piston defining the combustion chamber together with the cylinder, the piston reciprocating in the cylinder; and an active species generator that generates active species; wherein the internal combustion engine promotes combustion of the mixed gas by the active species generated by the active species generator, and the piston includes formed therein an active species generation chamber open to a top surface of the piston, and in which the active species generator generates the active species.

In accordance with a first aspect of the present invention, an active species generation chamber in which active species are generated by an active species generator is formed in a piston. The active species generation chamber is held in communication with a combustion chamber through an opening of a top surface of the piston. Since the active species generation chamber is formed in the piston, the active species generation chamber has a smaller cross sectional area (area of a cross-sectional surface perpendicular to a direction in which the piston reciprocates) than the combustion chamber. Accordingly, if the active species generation chamber is seen from the cross-sectional surface, a ratio of a region in which the active species are generated is relatively high. Accordingly, it is easier for the active species and the mixed gas to come in contact with each other in the active species generation chamber.

A second aspect of the present invention is an internal combustion engine as set forth in claim 1, wherein the active species generator includes a spark plug protruding from a position facing toward an opening of the active species generation chamber toward a side of the combustion chamber, on a boundary surface that partitions the combustion chamber, and the active species generator generates active species in the active species generation chamber from a time point at which the spark plug enters into the active species generation chamber to a time point at which the spark plug moves out of the active species generation chamber in a compression stroke.

In accordance with a second aspect of the present invention, the active species are generated while the spark plug enters into the active species generation chamber.

A third aspect of the present invention is an internal combustion engine as set forth in claim 2, wherein the active species generator generates active species in the combustion chamber after the spark plug moves out of the active species generation chamber in an expansion stroke.

In accordance with a third aspect of the present invention, the active species are generated in the active species generation chamber while the spark plug enters into the active species generation chamber, and the active species are generated in the combustion chamber after the spark plug moves out of the active species generation chamber. Accordingly, the mixed gas in the combustion chamber comes in contact with not only the active species supplied from the active species generation chamber but also the active species supplied from the combustion chamber.

A fourth aspect of the present invention is an internal combustion engine as set fourth in claim 1, wherein the active species generator includes an antenna that radiates electromagnetic waves to the active species generation chamber, the active species generation chamber includes an electrode that locally increases an electric field intensity of electromagnetic waves radiated from the antenna, and when electromagnetic waves are radiated from the electromagnetic wave radiator, in the vicinity of the electrode, plasma is generated and active species are generated.

In accordance with a fourth aspect of the present invention, the active species generation chamber includes an electrode that locally increases an electric field intensity of electromagnetic waves. When the electromagnetic waves are radiated from the antenna, in the vicinity of the electrode, plasma is generated and active species are generated. In accordance with the fourth aspect of the present invention, active species are generated in the active species generation chamber even while the antenna is not present in the active species generation chamber.

A fifth aspect of the present invention is an internal combustion engine as set forth in any one of claims 1 to 4, further comprising a peripheral edge-side active species generator that generates active species at a peripheral edge of the combustion chamber.

In accordance with a fifth aspect of the present invention, active species are generated at peripheral edges of the combustion chamber during an expansion stroke. Here, some active species such as, for example, OH radicals have short lifetime. Accordingly, the active species generated in the active species generation chamber may be extinguished before the active species reach a peripheral edge of the combustion chamber. Accordingly, active species are generated at the peripheral edge of the combustion chamber during an expansion stroke, thereby making it possible for the active species to come in contact with the mixed gas at the peripheral edge of the combustion chamber.

A sixth aspect of the present invention is an internal combustion engine as set forth in any one of claims 1 to 5, wherein the active species generator generates active species by generating plasma.

In accordance with a sixth aspect of the present invention, the internal pressure of the active species generation chamber increases due to the plasma. Accordingly, the active species in the active species generation chamber are ejected into the combustion chamber.

A seventh aspect of the present invention is an internal combustion engine as set forth in any one of claims 1 to 6, wherein the active species generator generates, using less energy than the minimum ignition energy, active species prior to ignition of the mixed gas.

In accordance with a seventh aspect of the present invention, active species are generated, using less energy than the minimum ignition energy, prior to ignition of the mixed gas. Accordingly, the mixed gas is reformed before being ignited.

A eighth aspect of the present invention is an internal combustion engine as set forth in any one of claims 1 to 5, wherein the active species generator compresses and ignites the mixed gas after the active species generator generates active species.

In accordance with an eighth aspect of the present invention, the mixed gas is compressed and ignited after the active species have contacted with the mixed gas.

A ninth aspect of the present invention is an internal combustion engine as set forth in claim 1, wherein the active species generator includes an antenna that radiates electromagnetic waves to the active species generation chamber, the active species generation chamber is configured so as to resonate with electromagnetic waves radiated from the antenna.

In accordance with a ninth aspect of the present invention, resonance takes place in the active species generation chamber by electromagnetic waves radiated from the antenna. Accordingly, a strong electric field is generated.

Effect of the Invention

According to the present invention, active species are generated in the active species generation chamber which has a smaller cross sectional area than the combustion chamber so that it becomes easier for active species and mixed gas to come in contact with each other. Accordingly, in comparison with a case in which active species are generated in the combustion chamber, an amount of mixed gas whose chemical reaction is promoted by the active species can be increased, and the effect of promoting combustion by the active species can be enhanced.

In accordance with the third aspect of the present invention, it is possible for the mixed gas in the combustion chamber to come into contact with not only active species supplied from the active species generation chamber, but also active species generated in the combustion chamber. Accordingly, the effect of promoting combustion by the active species can be further enhanced.

In accordance with the fourth aspect of the present invention, active species can be generated in the active species generation chamber even in a state in which an antenna is not provided in the active species generation chamber. It is possible to generate active species in the active species generation chamber at a timing earlier than when the piston reaches the top dead center by a certain amount of time, for example, at a timing earlier than when the mixed gas is ignited, without causing a part to which an antenna is provided to largely protrude toward the side of the combustion chamber. If the part to which the antenna is provided excessively protrudes to a side of the combustion chamber, the part would hamper heat dissipation, and thus, the part would be subjected to damage. Accordingly, it is possible to generate active species in the active species generation chamber at a timing earlier than when the piston reaches the top dead center by a certain amount of time, while preventing the part to which the antenna is provided from being damaged.

In accordance with the fifth aspect of the present invention, active species are generated at a peripheral edge of the combustion chamber during an expansion stroke so that the active species come in contact with the mixed gas at the peripheral edge of the combustion chamber. As a result thereof, an amount of mixed gas which comes in contact with the active species can be increased, and accordingly, the effect of promoting combustion by the active species can be further enhanced.

In accordance with the sixth aspect of the present invention, the internal pressure of the active species generation chamber increases owing to the plasma so that the active species in the active species generation chamber is ejected into the combustion chamber. As a result thereof, an amount of mixed gas which comes in contact with the active species can be increased, and accordingly, the effect of promoting combustion by the active species can be further enhanced.

BEST MODE FOR CARRYING OUT THE INVENTION

In the following, a detailed description will be given of preferred embodiments of the present invention with reference to drawings. It should be noted that the following embodiments are mere examples that are essentially preferable, and are not intended to limit the scope of the present invention, applied field thereof, or application thereof.

<Configuration of Internal Combustion Engine>

Figure 1:
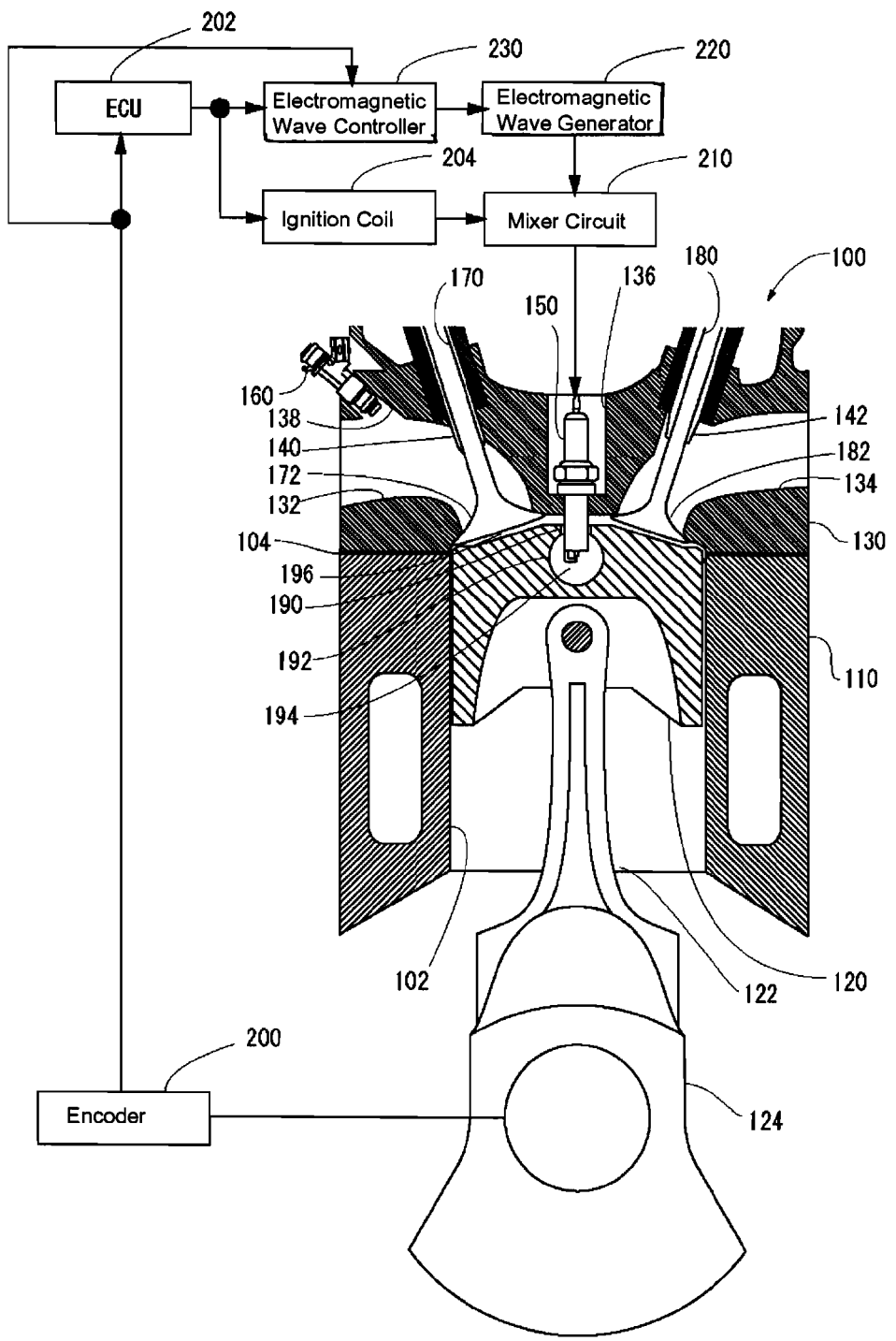
FIG. 1 is a schematic block diagram of an internal combustion engine of an embodiment.

The present embodiment is constituted by an internal combustion engine 100 (reciprocating internal combustion engine) according to the present invention. The internal combustion engine 100 is a four stroke gasoline engine. The internal combustion engine 100 is shown in FIG. 1 as including a cylinder block 110, a cylinder head 130, and a piston 120.

The cylinder block 110 is formed with four cylinders 102 each having a circular cross-section. The piston 120 is in the form of an approximately cylindrical shape, and has a circular cross-section corresponding to that of the cylinder 102. The piston 120 is slidably provided in the cylinder 102. The piston 120 is connected with a connecting rod 122 extending toward a direction away from the cylinder head 130. On the other side opposite to the piston 120, the connecting rod 122 is connected with a crankshaft 124 that serves as an output shaft of the internal combustion engine 100. The crankshaft 124 is rotatably supported by the cylinder block 110. When the piston 120 reciprocates in an axial direction of the cylinder 102, the connecting rod 122 converts the reciprocal movement of the piston 120 into a rotational movement of the crankshaft 124 in each cylinder 102.

The cylinder head 130 is carried on the cylinder block 110 with a gasket 104 intervening therebetween. The cylinder block 110, the piston 120, and the cylinder head 130 define a combustion chamber 196 of the internal combustion engine 100.

One or a plurality of intake ports 132 and one or a plurality of exhaust ports 134 are formed in the cylinder head 130 for each of the cylinders 102. The intake port 132 and the exhaust port 134 pass through the cylinder head 130, and are open at positions facing toward a top surface of the piston 120 (a surface partly partitioning the combustion chamber 196) at respective one ends. An intake valve guide hole 140 is open to the intake port 132. An exhaust valve guide hole 142 is open to the exhaust port 134. The intake port 132 partly constitutes an intake passage of the internal combustion engine 100, and the exhaust port 134 partly constitutes an exhaust passage of the internal combustion engine 100.

For respective cylinders 102, plug mounting holes 136 are formed in the cylinder heads 130. The plug mounting hole 136 is passing through the cylinder head 130 and open at one end at a position facing toward the top surface of the piston 120. One spark plug 150 is provided in the cylinder head 130 for each cylinder 102.

The spark plug 150 partly constitutes an active species generator that generates active species. The spark plug 150 is mounted in the plug mounting hole 136. The spark plug 150 is fitted in an active species generation chamber 194 formed in the piston 120. More specifically, the spark plug 150 protrudes from a position facing toward a communication hole 190 of the active species generation chamber 194 to the side of the combustion chamber 196, on a boundary surface that partitions the combustion chamber 196 in the cylinder head 130. The spark plug 150 enters into the active species generation chamber 194 when the piston 120 moves from the bottom dead center to the top dead center. On the other hand, the spark plug 150 comes out of the active species generation chamber 194 when the piston 120 moves from the top dead center to the bottom dead center.

An injector mounting hole 138 is open to the intake port 132. A fuel injection device 160 (injector) that injects fuel is mounted to the injector mounting hole 138. A fuel injection hole of the injector 160 is open to the intake port 132. A fuel supply tube is connected to the injector 160. Fuel injected from the injector 160 is supplied to air that flows in the intake port 132. Mixed gas in which the fuel and air are mixed is introduced to the combustion chamber 196. In the combustion chamber 196, the mixed gas that has been mixed in advance is combusted.

The intake port 132 includes an intake valve 172 that opens and closes the intake port 132. A valve stem 170 of the intake valve 172 is reciprocally fitted in the intake valve guide hole 140. The intake valve 172 is actuated by a valve train (not shown) that includes a cam and the like, to open and close the intake port 132.

The exhaust port 134 includes an exhaust valve 182 that opens and closes the exhaust port 134. A valve stem 180 of the exhaust valve 182 is reciprocally fitted in the exhaust valve guide hole 142. The exhaust valve 182 is activated by a valve train (not shown) that includes a cam and the like, to open and close the exhaust port 134.

In the present embodiment, in the top surface of the piston 120, a depression is formed in a region facing toward the spark plug 150. This depressed portion constitutes the aforementioned active species generation chamber 194. The active species generation chamber 194 is open to the top surface of the piston 120, and active species are generated by the active species generator.

The active species generation chamber 194 is held in communication with the combustion chamber 196 through a circular communication hole 190. The communication hole 190 has a shape corresponding to the protruded portion of the spark plug 150. As shown in FIG. 1, the spark plug 150 is inserted in the communication hole 190 when the piston is provided at the top dead center. The spark plug 150 remains in a state in which the spark plug 150 is inserted in the communication hole 190 from a time immediately before to a time immediately after the piston 120 reaches the top dead center. In this state, the combustion chamber 196 and the active species generation chamber 194 are held in communication with each other through a gap between a hole surface of the communication hole 190 and the spark plug 150.

In the depressed portion, a wall surface 192, excluding the communication hole 190, is in the form of a spherical surface shape. This means that the active species generation chamber 194 defines a spherical space. In a state in which the piston 120 is provided at the top dead center, the discharge gap of the spark plug 150 is located at the center of the active species generation chamber 194. The diameter of the active species generation chamber 194 is larger than the diameter of the outer peripheral surface of the spark plug 150.

In the internal combustion engine 100, the total volume of the combustion chamber 196 and the active species generation chamber 194 corresponds to the clearance volume of the general internal combustion engine. With respect to the total volume of the combustion chamber 196 and the active species generation chamber 194, the total volume when the piston 120 is provided at the bottom dead center may be equal to or more than ten times as large as the total volume when the piston 120 is provided at the top dead center. This means that the compression ratio of the internal combustion engine 100 may be equal to or more than ten. Also, the compression ratio may be equal to or more than fourteen.

The internal combustion engine 100 includes an encoder 200, an engine control unit (ECU) 202, and an ignition coil 204. The encoder 200 outputs a detection signal when a rotation angle of the crankshaft 124 is at a predetermined angle. The engine control unit 202 is connected with the encoder 200, the injector 160, and the ignition coil 204. The engine control unit 202 controls the injector 160 and the ignition coil 204 using the detection signal of the encoder 200 as a reference signal of timing. The injector 160 is adapted to inject fuel in accordance with an injection instruction signal outputted from the engine control unit 202. The injection coil 204 is adapted to generate high voltage pulses from electric power supplied thereto, in accordance with an ignition instruction signal outputted from the engine control unit 202. As the encoder 200 and the ignition coil 204, an encoder and an ignition coil generally used for the internal combustion engine may be employed.

In the present embodiment, the internal combustion engine 100 further includes a mixer circuit 210, an electromagnetic wave generator 220, and an electromagnetic wave controller 230.

The electromagnetic wave controller 230 is connected with the encoder 200, the engine control unit 202, and the electromagnetic wave generator 220. As a reference signal for timing, the electromagnetic wave controller 230 converts the ignition instruction signal and the detection signal from the encoder 200 into a control signal that determines the drive sequence of the electromagnetic wave generator 220. Here, the drive sequence indicates a start time and a termination time of generation of electromagnetic wave, power of the electromagnetic wave, and the like. The electromagnetic wave controller 230 controls the electromagnetic wave generator 220 so that an electromagnetic wave of a predetermined power can be generated during a predetermined time zone in the vicinity of time at which high-voltage pulses are generated by the ignition coil 204. The electromagnetic wave controller 230 causes the electromagnetic wave generator 220 to intermittently generate electromagnetic waves during the above-mentioned time zone.

The electromagnetic wave generator 220 includes an oscillator configured by a magnetron, and a power source device that drives the oscillator. The electromagnetic wave generator 220 generates electromagnetic waves in response to an electromagnetic wave generation instruction supplied from the electromagnetic wave controller 230. More specifically, the oscillator is a magnetron that oscillates electromagnetic waves of 2.4 GHz band. The power source device is an inverter power source that includes a boosting transformer and the like. Here, the oscillator may be, for example, a klystron, a semiconductor oscillator, an LC resonance circuit, or the like.

The active species generation chamber 194 may be dimensioned so as to form a resonant cavity structure that resonates with electromagnetic waves radiated on the active species generation chamber 194. For example, the dimensions of the active species generation chamber 194 are determined in accordance with frequencies of electromagnetic waves generated by the electromagnetic wave generator 220. Also, the dimensions of the active species generation chamber 194 may be determined using a compression ratio of the internal combustion engine 100.

The mixer circuit 210 includes a DC (direct current) line, an electromagnetic wave input terminal, a polar plate, an insulation portion, and a housing. The DC line connects the ignition coil 204 with an input terminal of the spark plug 150. The electromagnetic wave input terminal is constituted by an input terminal of a coaxial line. The polar plate is connected with a central conductive body of the electromagnetic wave input terminal, and capacitively couple the electromagnetic wave input terminal with the DC line. The insulation portion ensures electrical insulation between the DC line and the polar plate. The housing is constituted by a conductive member and accommodates the DC line, the electromagnetic wave input terminal, the polar plate, and the insulation portion.

In the mixer circuit 210, the input side of the DC line is connected with the ignition coil 204, the electromagnetic wave input terminal is connected with the electromagnetic wave generator 220, and an output side of the DC line is connected with the spark plug 150. The mixer circuit 210 is adapted to superimpose high voltage pulses and electromagnetic waves and apply them to the spark plug 150.

Electric power is supplied from a power source (not shown) to the encoder 200, the engine control unit 202, the ignition coil 204, the electromagnetic wave generator 220, and the electromagnetic wave controller 230. The power source may be, for example, 12V DC automobile battery. Also, the power source may be, for example, 100V AC (alternate current) home power source. In a case in which an AC power source is used as the power source, power is supplied to the ignition coil 204 through an AC adapter.

In the present embodiment, the ignition coil 204, the electromagnetic wave generator 220, the mixer circuit 210, and the spark plug 150 constitute an active species generator. The active species generator is adapted to generate active species by generating plasma. Furthermore, the active species generator ignites the mixed gas by generating plasma. In the active species generator, the electromagnetic wave generator 220, the mixer circuit 210, and the spark plug 150 constitute an electromagnetic wave radiator that radiates electromagnetic waves to the active species generation chamber 194. A central electrode of the spark plug 150 serves as an antenna of the electromagnetic wave radiator.

In the active species generator, when a high voltage pulse is supplied to the central electrode of the spark plug 150, a spark discharge is generated in a discharge gap between the central electrode and a ground electrode. Following this spark discharge, small scale plasma is generated. On the other hand, electromagnetic waves are radiated from the central electrode of the spark plug 150. The small scale plasma absorbs energy from the electromagnetic waves and expands.

In the present embodiment, electromagnetic waves are radiated from the central electrode of the spark plug 150 before the spark discharge is generated. The electromagnetic waves are continuously radiated until after the spark discharge is generated. The electromagnetic waves are radiated for an extremely short period. Here, start of radiating electromagnetic waves may be after the spark discharge is generated as long as the electromagnetic waves are radiated before the small scale plasma is extinguished.

<Operation of Internal Combustion Engine>

The internal combustion engine 100 is constituted by a four stroke internal combustion engine. In the combustion chamber 196, while the piston 120 is reciprocated by two times, four strokes including an intake stroke in which mixed gas is drawn in, a compression stroke, an expansion stroke, and an exhaust stroke in which combustion gas is exhausted.

The intake stroke is carried out while the piston 120 moves from the top dead center toward the bottom dead center. When the intake valve opens, the intake port 132 and the combustion chamber 196 are held in communication with each other, and the mixed gas is introduced into the combustion chamber 196. When the intake port 132 is closed, the intake stroke is terminated.

Subsequently, in the compression stroke, the mixed gas is compressed in the combustion chamber as the piston 120 moves closer to the top dead center. Immediately before the piston 120 reaches the top dead center, a projecting portion of the spark plug 150 is inserted in to the communication hole. Then, at a timing when the discharge gap of the spark plug 150 reaches in the vicinity of the center of the active species generation chamber 194, the engine control unit 202 outputs an ignition instruction signal to the ignition coil 204, and an electromagnetic wave oscillation signal to the electromagnetic wave controller 230. In response to the ignition instruction signal, the ignition coil 204 applies a high voltage pulse to the spark plug 150 through the mixer circuit 210. Upon receiving this high voltage pulse, the spark plug 150 generates a spark discharge in the discharge gap. On the other hand, in response to the electromagnetic wave oscillation signal, the electromagnetic wave controller 230 outputs a control signal to electromagnetic wave generator 220. The electromagnetic wave generator 220 generates electromagnetic waves in accordance with the drive sequence determined by the control signal. The electromagnetic wave generator 220 applies the electromagnetic waves to the spark plug 150 through the mixer circuit 210. The electromagnetic waves are radiated to the combustion chamber 196 from the central electrode of the spark plug 150. When plasma generated by the spark discharge is exposed to the electromagnetic waves, energy is supplied to charged particles in the plasma, and then, the charged particles are accelerated to collide with molecules of the mixed gas surrounding them. As a result thereof, molecules of the mixed gas are ionized, and a plasma region expands.

The plasma thus expanded supplies heat energy to the mixed gas in the active species generation chamber 194 and, at the same time, generates active species such as OH radical, ozone radical, and the like. The active species promote the chemical reactions of the mixed gas, and form a flame kernel. The flame is propagated from the flame kernel toward a wall surface 192 in the active species generation chamber 194, and thus, the mixed gas is burnt in the active species generation chamber 194. As a result thereof, pressure in the active species generation chamber 194 is rapidly increased, and pressure waves advance from the vicinity of the center of the active species generation chamber 194 toward the wall surface 192. Since the active species generation chamber 194 is in the form of a spherical shape, the pressure waves arrive at the wall surface 192 approximately at the same timing. Accordingly, a pressure gradient is unlikely to be generated in the vicinity of the wall surface 192, and spontaneous auto ignitions are unlikely to occur at the wall surface 192. This means that occurrence of knocking caused by combustion in the active species generation chamber 194 is suppressed. Furthermore, since the plasma expands, a combustion period in the active species generation chamber 194 is decreased in comparison with a case in which the ignition is performed merely by the spark discharge. Furthermore, the mixed gas can be stably ignited even under high compression ratio.

During the combustion process in the active species generation chamber 194, when pressure in the active species generation chamber 194 increases, gas in the active species generation chamber 194 acts to push the spark plug 150 out of the active species generation chamber 194. This pushing force urges the piston 120 toward to the bottom dead center. When the piston 120 moves from the top dead center toward the bottom dead center after the ignition, the spark plug 150 comes out of the communication hole 190, and the combustion chamber 196 and the active species generation chamber 194 are held in communication with each other. Then, high temperature and high pressure gas in the active species generation chamber 194 is rapidly ejected toward the combustion chamber 196. As a result thereof, the gas ejected from the active species generation chamber 194 is decreased in temperature as a result of rapid adiabatic expansion. Also, the gas ejected from the active species generation chamber 194 agitates and mixes with the mixed gas in the combustion chamber 196. Furthermore, the active species surrounded by the gas ejected from the active species generation chamber 194 comes in contact with the mixed gas in the combustion chamber 196. The mixed gas in the combustion chamber 196 is ignited and combusted upon receiving heat energy of the gas ejected from the active species generation chamber 194. The combustion of the mixed gas in the combustion chamber 196 is promoted by the active species supplied from the active species generation chamber 194.

During the expansion stroke, the gas in the combustion chamber 196 and the gas in the active species generation chamber 194 are expanded to urge the piston 120 toward the side of the bottom dead center, while combustion is progressed in the combustion chamber 196. The expansion stroke continues until the piston 120 reaches the bottom dead center.

The exhaust stroke is carried out while the piston 120 moves from the bottom dead center toward the top dead center. When the exhaust valve is opened, and the exhaust port 134 and the combustion chamber 196 are held in communication with each other, gas in the combustion chamber 196 is exhausted from the exhaust port 134. The exhaust stroke is terminated when the exhaust port 134 is closed.

Effect of the Embodiment

In the present embodiment, active species are generated in the active species generation chamber 194 which has a smaller cross sectional area than the combustion chamber 196, so that it becomes easier for the active species and the mixed gas to come in contact with each other. Accordingly, in comparison with a case in which active species are generated in the combustion chamber 196, an amount of mixed gas whose chemical reaction is promoted by the active species can be increased, and the effect of promoting combustion by the active species can be enhanced.

In the present embodiment, internal pressure of the active species generation chamber 194 is increased by the plasma, so that the active species in the active species generation chamber 194 can be ejected toward the combustion chamber 196. Accordingly, it is possible to increase an amount of the mixed gas which comes in contact with the active species, thereby further enhancing the effect of the combustion by the active species.

Furthermore, in the present embodiment, combustion is carried out in the combustion chamber 196 and the active species generation chamber 194 in a stage-wise manner. Accordingly, it is possible to adjust the progress of combustion in a time scale on the whole. This contributes to enhancement of thermal efficiency of the internal combustion engine.

Furthermore, in the present embodiment, the ignition method of using the spark discharge and microwave in combination is employed so that the mixed gas can be stably ignited even under the condition of a high compression ratio. Immediately after the ignition, the combustion chamber 196 and the active species generation chamber 194 are partitioned. Accordingly, combustion can be performed in two stages accompanied with adiabatic expansion, thereby preventing excessive increase in combustion temperature. This contributes to reduction of $NO_x$. Furthermore, owing to the gas ejected from the active species generation chamber 194, the mixed gas provided in the combustion chamber 196 can be made turbulent. Accordingly, the combustion of the mixed gas can be promoted. Furthermore, since the active species generation chamber 194 is formed in an approximately spherical shape, occurrence of knocking or the like can be suppressed. In view of the above descriptions, it is possible to stably combust mixed gas and suppress the generation of nitrogen oxides and the occurrence of knocking under a condition of high compression ratio with high thermal efficiency.

Meanwhile, a protruded amount of the spark plug 150 and an ignition timing may be selected as appropriate so that a timing when the active species generation chamber 194 and the combustion chamber 196 come in communication with each other after ignition is prior to a timing when gas temperature of the active species generation chamber 194 reaches, for example, 2000K. In this manner, $NO_x$ can be reduced more efficiently.

First Modification of Embodiment

Figure 2:
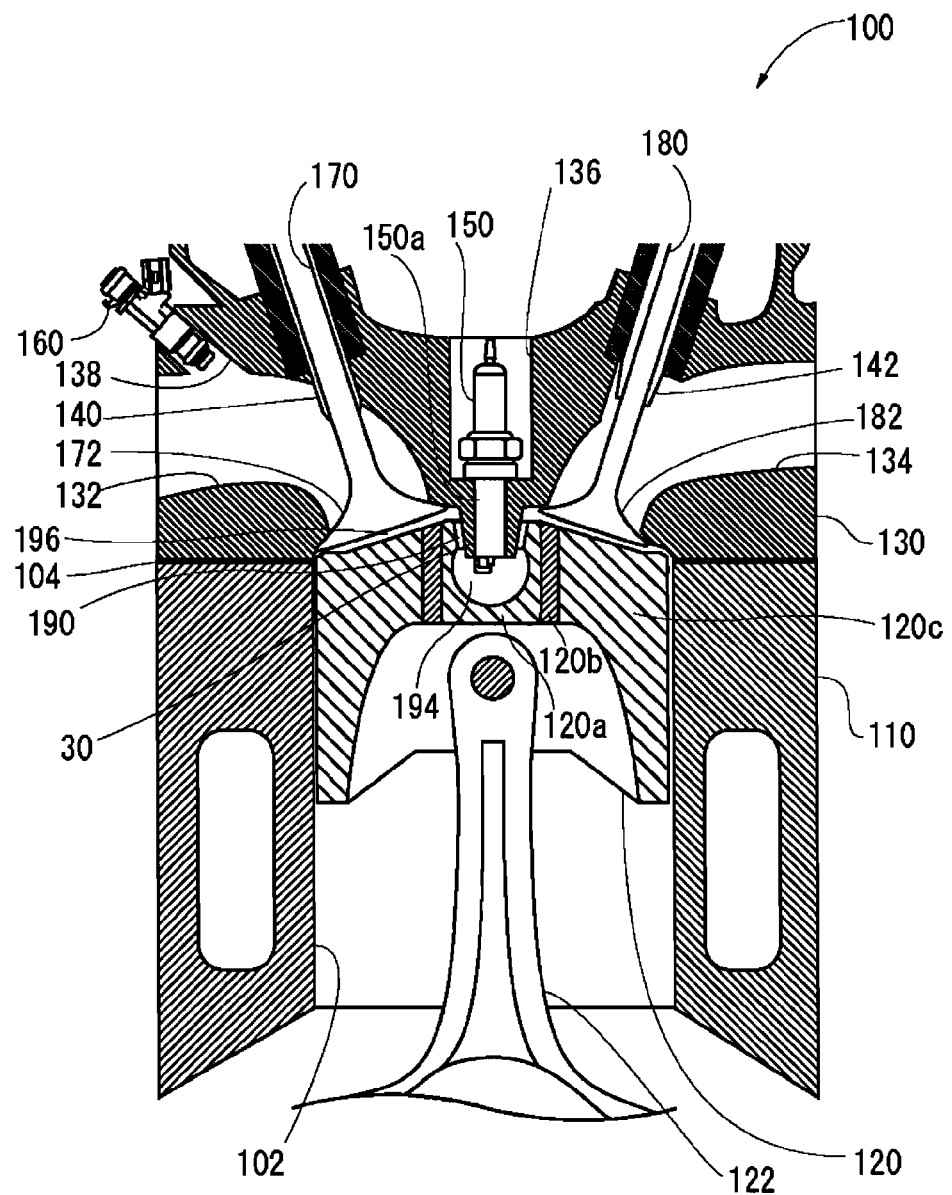
FIG. 2 is a cross-sectional view of an internal combustion engine of a first modification of the embodiment.

According to a first modification, as shown in FIG. 2, the piston 120 includes a cylindrical insulation member 120b that surrounds the active species generation chamber 194. The insulation member 120b is made of, for example, a ceramic. A central portion 120a of the piston 120 is fitted in the inside of the insulation member 120b. The insulation member 120b is fitted in the inside of a peripheral portion 120c of the piston 120.

According to the first modification, heat energy is supplied to the mixed gas by generating and expanding plasma in the active species generation chamber 194. The heat energy of the mixed gas in the active species generation chamber 194 is transmitted to the piston 120 and then dissipated. According to the first modification, the insulation member 120b reduces the amount of heat transmitted from the mixed gas in the active species generation chamber 194 to the piston 120. Accordingly, a large amount of heat energy can be supplied from the mixed gas in the active species generation chamber 194 to the mixed gas in the combustion chamber 196.

Also, according to the first modification, as shown in FIG. 2, a portion 30 constituting a plug mounting hole 136 in the cylinder head 130 is protruded toward the side of the combustion chamber 196. An internal surface of the protruded portion 30 abuts with a portion 150a, which is to be threadably engaged with the plug mounting hole 136, of the spark plug 150. Accordingly, since heat generated at a tip of the spark plug 150 is dissipated through the protruded portion 30, it is possible to reduce the damage of the spark plug 150. Meanwhile, the configuration, in which a protruded portion 30 is provided in the cylinder head 130 so that the heat at the tip of the spark plug 150 is dissipated therethrough is applicable to the above-mentioned embodiment and second to fourth modifications, which will be described later.

Second Modification of Embodiment

Figure 3:
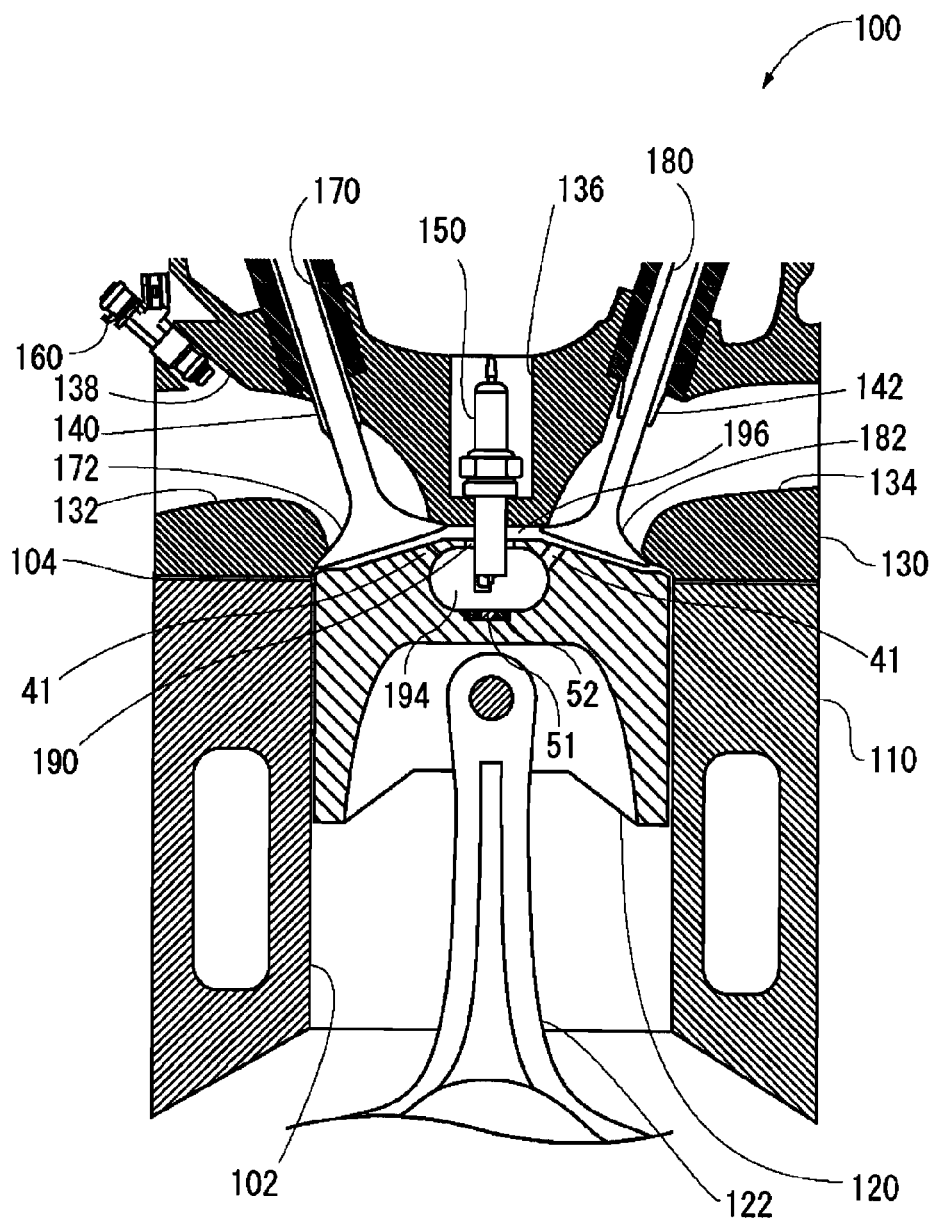
FIG. 3 is a cross-sectional view of an internal combustion engine of a second modification of the embodiment.

In the second modification, as shown in FIG. 3, an electrode 51 is provided in the active species generation chamber 194. The electrode 51 is adapted to locally increase an electric field intensity of electromagnetic waves radiated from the central electrode of the spark plug 150. An insulation ring 52 is provided around the electrode 51. When electromagnetic waves are radiated from the central electrode of the spark plug 150, plasma is generated in the vicinity of the electrode 51, and thus, active species are generated. When electromagnetic waves are radiated, high voltage pulses may be supplied to the spark plug 150 to cause an electrical discharge in a discharge gap. In this manner, it is possible to reduce the energy of the electromagnetic waves required to generate plasma.

According to the second modification, during the compression stroke, before the spark plug 150 enters into the active species generation chamber 194, electromagnetic waves are radiated from the central electrode of the spark plug 150 to generate plasma in the vicinity of the electrode 51. Even while the spark plug 150 is not present in the active species generation chamber 194, active species are generated in the active species generation chamber 194. It is possible to generate active species in the active species generation chamber 194 at a timing earlier by a certain amount of time than when the piston 120 reaches the top dead center, for example, at a timing earlier than when the mixed gas is ignited, without causing the spark plug 150 to largely protrude toward the side of the combustion chamber 196. Accordingly, it is possible to generate active species in the active species generation chamber 194 at a timing earlier by a certain amount of time than when the piston 120 reaches the top dead center while reducing the damage of the spark plug 150.

Furthermore, according to the second modification, a plurality of external communication holes 41 are formed around the communication hole 190, which the spark plug 150 is inserted into. The external communication holes 41 ensure that the chamber 196 and the active species generation chamber 194 are held in communication with each other. The number of the external communication holes 41 is plural. Also, an outlet of the external communication hole 41 is facing toward the outside of the combustion chamber 196. The combustion gas and the active species in the active species generation chamber 194 are ejected not only through the communication hole 190 but also through the external communication holes 41.

Third Modification of Embodiment

Figure 4:
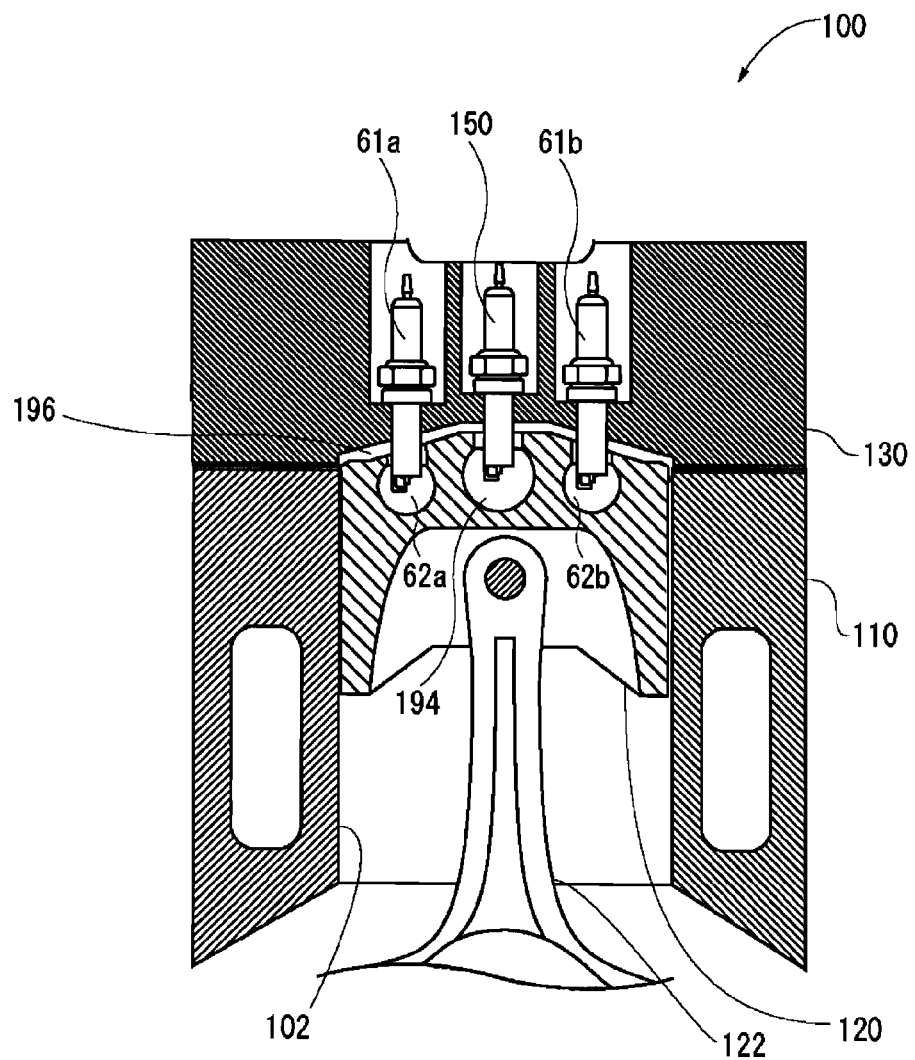
FIG. 4 is a cross-sectional view of an internal combustion engine of a third modification of the embodiment.

According to the third modification, as shown in FIG. 4, a plurality of active species generation chambers 194, 62a, and 62b are formed in the piston 120. In the piston 120, a plurality of out-side active species generation chambers 62a, 62b are formed around the center-side active species generation chamber 194. Also, a communication hole may be formed inside of the piston 120 so that the active species generation chambers 194, 62a, and 62b are held in communication with one another.

In the cylinder head 130, spark plugs 150, 61a, and 61b adapted to generate active species are provided in the respective active species generation chambers 194, 62a, and 62b. The spark plugs 150, 61a, and 61b are adapted to move into the respective active species generation chambers 194, 62a, and 62b when the piston 120 moves from the bottom dead center to the top dead center, and moves out of the respective active species generation chambers 194, 62a, and 62b when the piston 120 moves from the top dead center to the bottom dead center. High voltage pulses and electromagnetic waves are supplied to the respective spark plugs 150, 61a, and 61b, similar to the aforementioned embodiments.

According to the third modification, active species generated in the active species generation chambers 194, 62a, and 62b are ejected not only from the center of the combustion chamber 196 but also from peripheral areas of the combustion chamber 196. Accordingly, the amount of the mixed gas whose chemical reaction is promoted by the active species can be increased, and the effect of promoting combustion by the active species can be enhanced.

Fourth Modification of Embodiment

Figure 5:
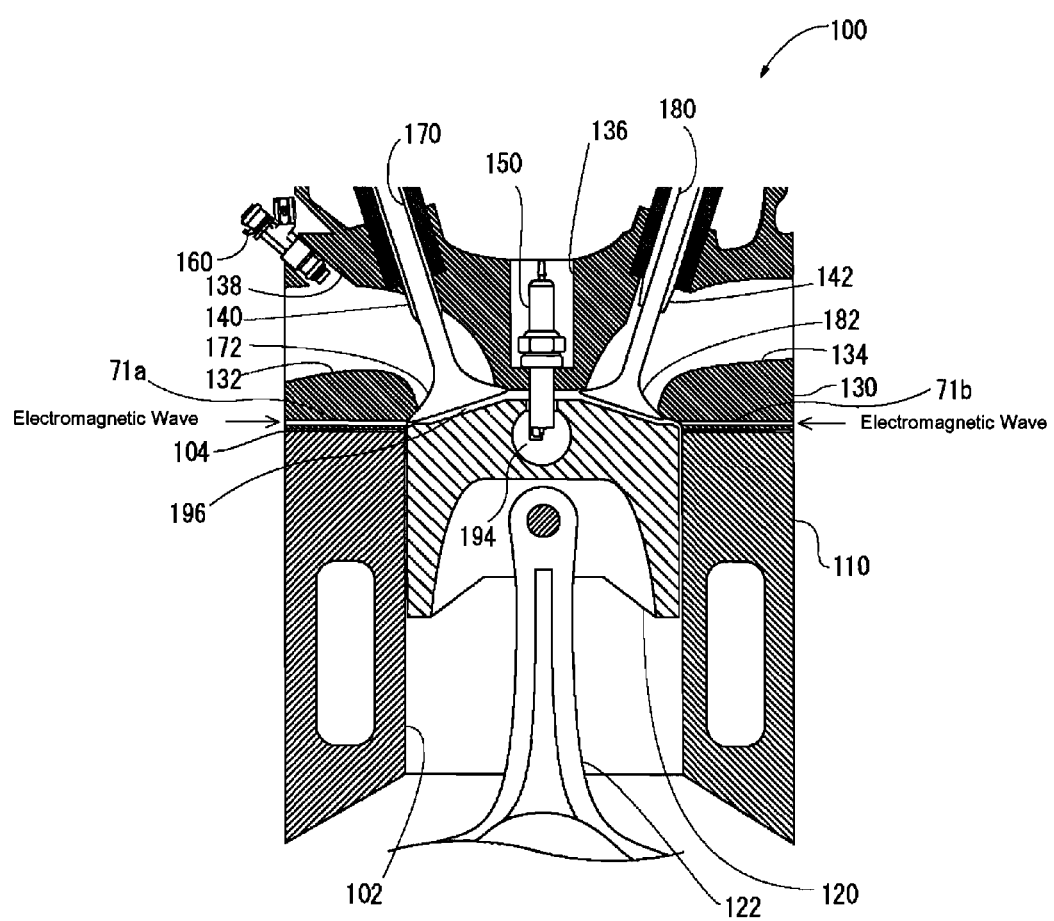
FIG. 5 is a cross-sectional view of an internal combustion engine of a fourth modification of the embodiment.

According to the fourth modification, as shown in FIG. 5, peripheral edge-side antennas 71a, 71b (peripheral edge-side active species generator) that generate active species at peripheral edges of the combustion chamber are provided. The peripheral edge-side antennas 71a, 71b are embedded in the cylinder head 130. The peripheral edge-side antennas 71a, 71b are insulated from the cylinder head 130.

In the expansion stroke (for example, immediately after the spark plug 150 is moved out of the active species generation chamber 194), when electromagnetic waves are radiated from the peripheral edge-side antennas 71a, 71b, strong electric fields are generated in the vicinity of tips of the peripheral edge-side antennas 71a, 71b, and plasmas are generated. Active species are generated at peripheral edges of the combustion chamber 196, accompanied with generation of plasmas. When the electromagnetic waves are radiated, an electric discharge may be generated in the discharge gap by supplying high voltage pulses to the spark plug 150.

According to the fourth modification, during the expansion stroke, active species are generated at the peripheral edges of the combustion chamber 196 so that the mixed gas at the peripheral edges of the combustion chamber comes in contact with the active species. Accordingly, the amount of mixed gas that comes in contact with the active species can be increased, and thus, the effect of promoting combustion by the active species can be enhanced.

Other Embodiment

The above described embodiment can also be configured as follows.

In the above-described embodiment, during the expansion stroke, after the spark plug 150 moves out of the active species generation chamber 194, high voltage pulses and electromagnetic waves may be supplied to the spark plug 150 so as to generate active species in the combustion chamber 196.

Furthermore, in the above-mentioned embodiment, the active species generator may be configured so as to generate, using less energy than the minimum ignition energy, active species prior to ignition of the mixed gas.

In the above-mentioned embodiment, a plurality of the active species generation chambers 194 may be continuously formed in a direction in which the piston 12 reciprocates.

In the above-mentioned embodiment, the internal combustion engine 100 may be configured such that the mixed gas in the combustion chamber 196 is compressed and ignited after the active species generator generates the active species. In this case, since the active species generated by the active species generator are supplied to pre-mixed gas before being ignited, the combustion of the pre-mixed gas is promoted.

Furthermore, in the above-mentioned embodiment, the internal combustion engine 100 employs the port-injection method. However, a direct injection method of directly injecting fuel into the combustion chamber 196 may be employed. In this case, a fuel injection hole of the injector 160 is formed in the combustion chamber 196. Also, another communication hole that makes the active species generation chamber 194 and the combustion chamber 196 in communication with each other may be formed in the piston 120 so that the injector 160 is inserted into the communication hole when the piston 120 is placed at the top dead center. When the piston 120 is provided at the top dead center, the injection hole of the injector 160 is open to the active species generation chamber 194. If communication holes are formed at two places, it becomes easy to scavenge gas from the active species generation chamber 194 to the combustion chamber 196.

Also, in the above-mentioned embodiment, electromagnetic waves and high voltage pulses are superimposed and applied to the spark plug 150, an antenna for radiating electromagnetic waves may be separately provided in the active species generation chamber 194, and thus, electromagnetic waves and high voltage pulses may be applied from different places. In this case, the antenna may be integrally formed with the spark plug 150. Also, the antenna may be separately formed with the spark plug, as well.

Furthermore, in the above-mentioned embodiment, electromagnetic waves may be radiated to plasma generated by laser or high frequencies, or the like, in place of the spark discharge. Also, electromagnetic waves may be radiated to thermo electrons, or flame generated by a pilot burner or the like. If electromagnetic waves are radiated to a place where charged particles are provided, the charged particles are accelerated. Therefore, plasma can be generated in the same manner as the above-mentioned embodiment.

In the above-mentioned embodiment, the internal combustion engine 100 may be constituted by a two-stroke engine internal combustion engine.

INDUSTRIAL APPLICABILITY

As described in the above, the present invention is applicable to an internal combustion engine in which a piston reciprocates.

EXPLANATION OF REFERENCE NUMERALS 100 internal combustion engine
102 cylinder
110 cylinder block
120 piston
130 cylinder head
150 spark plug (active species generator)
160 injector
194 active species generation chamber
196 combustion chamber

The invention claimed is:

1. An internal combustion engine, comprising:
a cylinder defining a combustion chamber that causes pre-mixed gas to be combusted;
a piston defining the combustion chamber together with the cylinder, the piston reciprocating in the cylinder;
an active species generator that generates active species;
an active species generation chamber, formed in the piston and is open to a top surface of the piston, and in which the active species generator generates the active species, wherein
the active species generator comprises:
a spark plug which extends into the combustion chamber such that the spark plug at least in part enters into and moves out of the active species generation chamber in accordance with the reciprocation of the piston; and
an antenna that radiates electromagnetic waves to the active species generation chamber or the combustion chamber.

2. The internal combustion engine as set forth in claim 1, further comprising:
a controller which controls the active species generator to generate the active species at a given timing, wherein
the active species generator is controlled by the controller to generate the active species in the active species generation chamber from a time point at which the spark plug enters into the active species generation chamber to a time point at which the spark plug moves out of the active species generation chamber in a compression stroke.

3. The internal combustion engine as set forth in claim 2, wherein
the active species generator generates active species in the combustion chamber after the spark plug moves out of the active species generation chamber in an expansion stroke.

4. The internal combustion engine as set forth in claim 1, wherein the active species generator includes the antenna that radiates electromagnetic waves to the active species generation chamber, the active species generation chamber includes an electrode that locally increases an electric field intensity of electromagnetic waves radiated from the antenna, and when electromagnetic waves are radiated from the electromagnetic wave radiator, in the vicinity of the electrode, plasma is generated and active species are generated.

5. The internal combustion engine as set forth in claim 1, further comprising a peripheral edge-side active species generator that generates active species at a peripheral edge of the combustion chamber.

6. The internal combustion engine as set forth in claim 1, wherein the active species generator generates active species by generating plasma.

7. The internal combustion engine as set forth in claim 1, wherein the active species generator generates, using less energy than the minimum ignition energy, active species prior to ignition of the mixed gas.

8. The internal combustion engine as set forth in claim 1, wherein the active species generator compresses and ignites the mixed gas after the active species generator generates active species.

9. The internal combustion engine as set forth in claim 1, wherein the active species generator includes an antenna that radiates electromagnetic waves to the active species generation chamber, the active species generation chamber is configured so as to resonate with electromagnetic waves radiated from the antenna.

10. An internal combustion engine, comprising:

a cylinder defining a combustion chamber that causes premixed gas to be combusted;

a piston defining the combustion chamber together with the cylinder, the piston reciprocating in the cylinder;

a second chamber, formed in the piston and is open to a top surface of the piston;

a spark plug which extends into the combustion chamber such that the spark plug at least in part enters into and moves out of the second chamber in accordance with the reciprocation of the piston; and an antenna that radiates electromagnetic waves to the second chamber or the combustion chamber.

* * * * *